United States Patent
Zimmer et al.

(10) Patent No.: US 8,001,308 B2
(45) Date of Patent: *Aug. 16, 2011

(54) METHOD AND SYSTEM FOR HANDLING A MANAGEMENT INTERRUPT EVENT IN A MULTI-PROCESSOR COMPUTING DEVICE

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/885,023

(22) Filed: Sep. 17, 2010

(65) Prior Publication Data

US 2011/0004715 A1    Jan. 6, 2011

Related U.S. Application Data

(63) Continuation of application No. 11/966,146, filed on Dec. 28, 2007, now Pat. No. 7,802,042.

(51) Int. Cl.
*G06F 13/24* (2006.01)
*G06F 15/00* (2006.01)
*G06F 15/76* (2006.01)

(52) U.S. Cl. ............. 710/260; 710/267; 712/13; 712/15

(58) Field of Classification Search .................. 710/260, 710/266–268, 13, 15; 712/28; 714/10, 13
See application file for complete search history.

(56) References Cited

U.S. PATENT DOCUMENTS

| | | |
|---|---|---|
| 4,769,768 A | 9/1988 | Bomba et al. |
| 5,109,329 A | 4/1992 | Strelioff |
| 5,437,039 A | 7/1995 | Yuen |
| 5,530,891 A | 6/1996 | Gephardt |
| 5,560,019 A | 9/1996 | Narad |
| 5,671,422 A | 9/1997 | Datta |
| 5,737,579 A | 4/1998 | Kimura et al. |
| 6,193,422 B1 | 2/2001 | Belt et al. |
| 6,212,587 B1 | 4/2001 | Emerson et al. |
| 6,272,618 B1 | 8/2001 | Tyner et al. |
| 6,453,278 B1 | 9/2002 | Favor et al. |

(Continued)

FOREIGN PATENT DOCUMENTS

DE    199 46 959 A1    4/2001

(Continued)

OTHER PUBLICATIONS

"The Free On-Line Dictionary of Computing". Entry 'interrupt'. Online Feb. 7, 1995. Retrieved from Internet Dec. 10, 2010. <http://foldoc.org/interrupt>.*

(Continued)

*Primary Examiner* — Thomas J Cleary
(74) *Attorney, Agent, or Firm* — Joni D. Stutman

(57) ABSTRACT

A method and system for handling a management interrupt, such as a system management interrupt (SMI) and/or a platform management interrupt (PMI), includes sequestering two or more processor cores from a plurality of processor cores to form a group of sequestered processor cores for handling the management interrupt. Generated management interrupts are directed to the group of sequestered processor cores and not to non-sequestered processor cores. At least one of the sequestered processor cores handles the management interrupt without disrupting the current operation of the non-sequestered processor cores.

22 Claims, 3 Drawing Sheets

U.S. PATENT DOCUMENTS

| | | |
|---|---|---|
| 6,711,642 B2 | 3/2004 | Huang |
| 6,775,728 B2 | 8/2004 | Zimmer et al. |
| 6,848,046 B2 | 1/2005 | Zimmer |
| 7,047,320 B2 | 5/2006 | Arimilli et al. |
| 7,350,006 B2 | 3/2008 | Yasue et al. |
| 7,433,985 B2 | 10/2008 | Ayyar et al. |
| 7,493,435 B2 | 2/2009 | Kobayashi et al. |
| 2001/0016892 A1 | 8/2001 | Klein |
| 2002/0099886 A1 | 7/2002 | Emerson et al. |
| 2002/0099893 A1 | 7/2002 | Nguyen et al. |
| 2005/0102457 A1 | 5/2005 | Stultz |
| 2005/0262571 A1 | 11/2005 | Zimmer et al. |
| 2006/0212677 A1 | 9/2006 | Fossum |
| 2007/0043347 A1 | 2/2007 | Solomita et al. |
| 2007/0113063 A1 | 5/2007 | Lewites |
| 2007/0156941 A1 | 7/2007 | Gupta et al. |
| 2007/0239932 A1 | 10/2007 | Zimmer |
| 2007/0266264 A1 | 11/2007 | Lewites et al. |
| 2007/0266265 A1 | 11/2007 | Zmudzinski et al. |
| 2007/0300299 A1 | 12/2007 | Zimmer |
| 2008/0005609 A1 | 1/2008 | Zimmer |
| 2008/0040458 A1 | 2/2008 | Zimmer |
| 2008/0065858 A1 | 3/2008 | Zimmer |
| 2008/0077993 A1 | 3/2008 | Zimmer et al. |
| 2008/0082710 A1 | 4/2008 | Nijhawan et al. |
| 2008/0163209 A1 | 7/2008 | Rozas et al. |
| 2009/0006830 A1 | 1/2009 | Zimmer et al. |
| 2009/0007104 A1 | 1/2009 | Zimmer et al. |
| 2009/0023414 A1 | 1/2009 | Zimmer et al. |
| 2009/0037932 A1 | 2/2009 | Clark et al. |
| 2009/0094481 A1 | 4/2009 | Vera et al. |
| 2009/0172232 A1 | 7/2009 | Zimmer et al. |

FOREIGN PATENT DOCUMENTS

| | | |
|---|---|---|
| EP | 0 924 610 A2 | 6/1999 |
| EP | 0 924 610 A3 | 4/2001 |
| WO | 02/093375 | 11/2002 |
| WO | 2007099181 | 7/2007 |

OTHER PUBLICATIONS

RHEL-RT AffinityHowto, http:rt.et.redhat.com/wiki/index__php?tiltle=RHEL-RT__AffinityHowto&printable=yes; last visited Feb. 17, 2010; earliest publication date believed to be Apr. 2007, 5 pgs.

Extensible FIrmware Interface Specification Version 1.10, Dec. 1, 2002 (Part one of two); 541 pgs.

Extensible FIrmware Interface Specification Version 1.10, Dec. 1, 2002 (Part two of two); 543 pgs.

Extensible Firmware Interface Specification Version 1.10, Specification Update, Intel Corporation, Version -001, Nov. 26, 2003, 63 pgs.

Intel Mulit-Core Processor Architecture Development Background, Copyright 2005, 6 pgs.

Birman, Kenneth P. et al. "Exploiting Virtual Synchrony in Distributed Systems". 1987. ACM. pp. 123-138.

"Paxos algorithm", Retrieved from URL: http://en.wikipedia.org/wiki/Paxos__algorithm, pp. 1-17 (Web Page was last modified on Feb. 26, 2008).

"Virtual synchrony", Retrieved from URL: http://en.wikipedia.org/wiki/Virtual__synchrony, pp. 1-9. (Web page was last modified Jan. 22, 2008).

David A. Rusling, "Interrupts and Interrupt Handling", The Linux Kernel, Chapter 7, Internet, Online, XP002232996, Retrieved from the Internet: URL http://www.tidp.org/LDP/tlk/tlk.html, Retrieved on Mar. 18, 2008, section 7.2, "Initializing the Interrupt Handing Data Structures", section 7.3, "Interrupt Handling", 5 pages.

Intel Corporation: "Extensible Firmware Interface Specification—version 1.02 Chapters 1, 16, 17" Online Specification, Dec. 12, 2000.

"The Peripheral Component Interconnect (PCI) Bus and vxWorks", Version Apr. 1, 1999, Retrieved from the Internet: URL: http://www-cdfonline.fnal.gov/daq/commercial/vxworks__pci.pdf, retrieved on Mar. 18, 2008, pp. 49-2, section , PCT Interrupt Handling.

Intel Corporation: "IA-64 System Abstraction Layer Specification" On Line Manual, Jan. 2000, XP002253057. 112 pages.

* cited by examiner

METHOD AND SYSTEM FOR HANDLING A MANAGEMENT INTERRUPT EVENT IN A MULTI-PROCESSOR COMPUTING DEVICE

CROSS-REFERENCE TO RELATED U.S. PATENT APPLICATION

This application is a continuation application of U.S. patent application Ser. No. 11/966,146 entitled "Method and System for Handling A Management Interrupt Event in a Multi-Processor Computing Device," which was filed on Dec. 28, 2007.

BACKGROUND

System management mode (SMM) is a special-purpose operating mode used by some processors to handle system-wide functions such as, for example, power management, system hardware control, or proprietary OEM (Original Equipment Manufacturer) designed code. System management mode is typically hidden from any operating system being executed by the processor. The processor, or individual cores of the processor, may be directed into system management mode by generation of a management interrupt event such as system management interrupt (SMI) or a platform management interrupt (PMI) depending upon the particular processor architecture. Such management interrupt events generally take precedence over non-maskable and maskable interrupts. In a typical multi-processor system, the system management interrupt and/or platform management interrupt is directed to each processor core of each processor to synchronously transition each processor to the system management mode (SMM). Each processor may independently handle the system management interrupt and/or platform management interrupt in system management mode.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
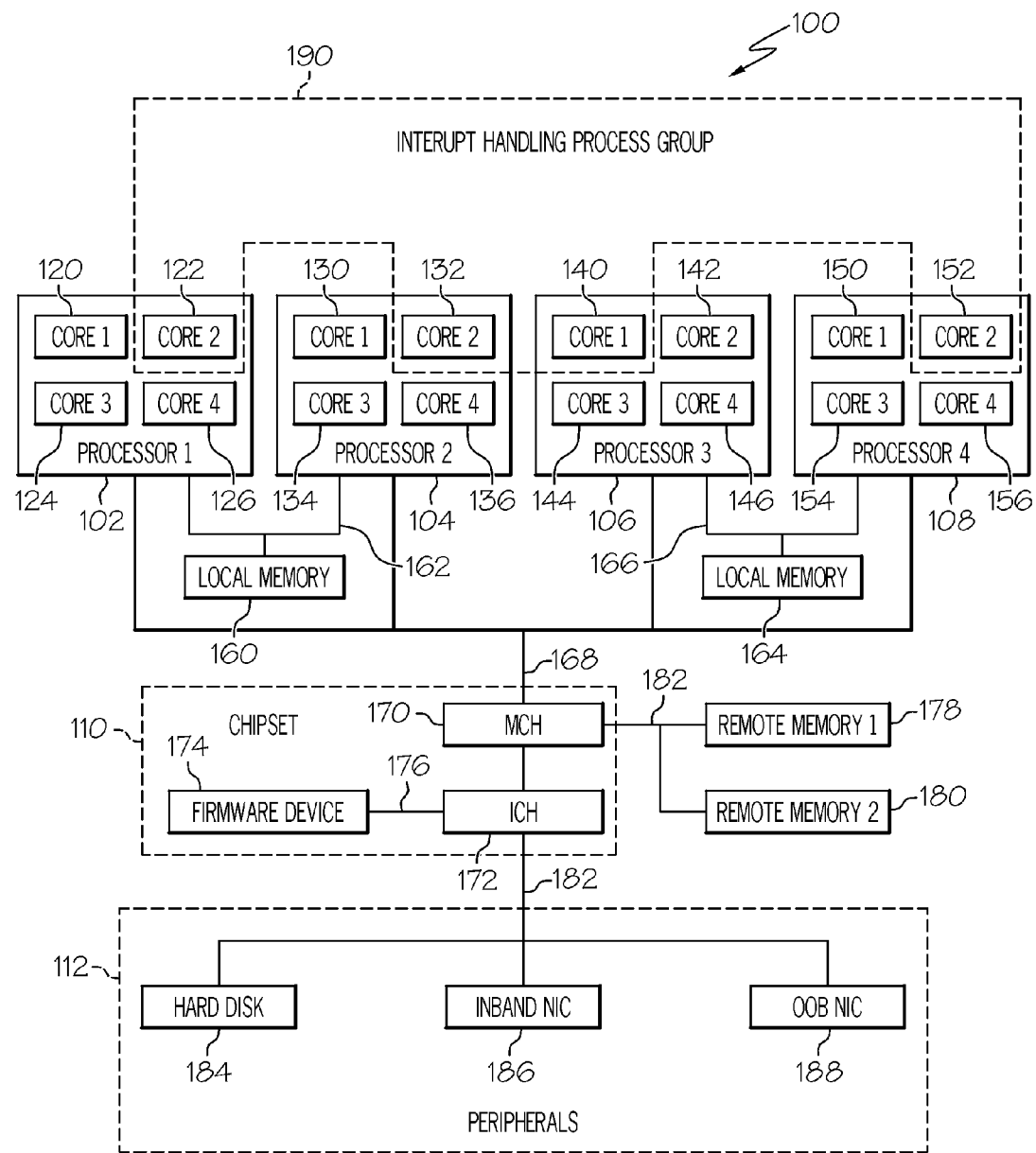
FIG. 1 is a simplified block diagram of a computing device having a number of processor cores allocated to a management interrupt handling process group.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, in one embodiment, a computing device 100 includes a plurality of processors 102, 104, 106, 108, a chipset 110, and a plurality of peripheral devices 112. The computing device 100 may be embodied as any type of computing device such as, for example, a desktop computer system, a laptop computer system, a server or enterprise computer system, or a handheld computing device. Each of the processors 102, 104, 106, 108 is a multi-core processor and includes a plurality of processor cores. For example, in the illustrative embodiment, processor 102 includes processor cores 120, 122, 124, 126; the processor 104 includes processor cores 130, 132, 134, 136; the processor 106 includes processor cores 140, 142, 144, 146; and the processor 108 includes processor cores 150, 152, 154, 156. Although the illustrative computing device 100 includes four processors 102, 104, 106, 108, the computing device 100 may include additional or fewer processors in other embodiments. Additionally, although the illustrative processors 102, 104 106, 108 each include four processor cores, processors having additional or fewer processor cores may be used in other embodiments.

In addition to an amount of cache memory, each of the processors 102, 104 106, 108 include, or are otherwise communicatively coupled to, a local memory device. For example, in the illustrative embodiment, the processors 102, 104 are communicatively coupled to a local memory device 160 via a number of signal paths 162. Similarly, the processors 102, 104 are communicatively coupled to a local memory device 164 via a number of signal paths 166. The signal paths 162, 166 may be embodied as any type of signal paths capable of facilitating communication between the processors 102, 104, 106, 108 and respective local memory devices 160, 164. For example, the signal paths 162, 166 may be embodied as any number of wires, printed circuit board traces, via, bus, point-to-point interconnects, intervening devices, and/or the like. The memory devices 160, 164 may be embodied as dynamic random access memory devices (DRAM), synchronous dynamic random access memory devices (SDRAM), double-data rate dynamic random access memory device (DDR SDRAM), and/or other volatile memory devices.

Each of the processors 102, 104, 106, 108 are communicatively coupled to the chipset 110 via a number of signal paths 168. Similar to the signal paths 162, 166, the signal paths 168 may be embodied as any type of signal paths capable of facilitating communication between the processors 102, 104, 106, 108 and the chipset 110. For example, the signal paths 168 may be embodied as any number of wires, printed circuit board traces, via, bus, point-to-point interconnects, intervening devices, and/or the like. The chipset 110 includes a memory controller hub (MCH) or northbridge 170, an input/output controller hub (ICH) or southbridge 172, and a firmware device 174. The firmware device 174 is communicatively coupled to the input/output controller hub 172 via a number of signal paths 176. Similar to the signal paths 162, 166, 168, the signal paths 176 may be embodied as any type of signal paths capable of facilitating communication between the input/output controller hub 172 and the firmware device 174 such as, for example, any number of wires, printed circuit board traces, via, bus, point-to-point interconnects, intervening devices, and/or the like. The firmware device 174 is illustratively embodied as a memory storage device for storing Basic Input/Output System (BIOS) data and/or instructions and/or other information.

The memory controller hub 170 is communicatively coupled to a number of remote memory devices 178, 180 via a number of signal paths 182. Again, similar to the signal paths 162, 166, 168 described above, the signal paths 182 may be embodied as any type of signal paths capable of facilitating communication between the memory controller hub 170 and the remote memory devices 178, 180 such as, for example, any number of wires, printed circuit board traces, via, bus, point-to-point interconnects, intervening devices, and/or the like. The memory devices 178, 180 may be embodied as dynamic random access memory devices (DRAM), synchronous dynamic random access memory devices (SDRAM), double-data rate dynamic random access memory device (DDR SDRAM), and/or other volatile memory devices. Additionally, although only two memory devices are illustrated in FIG. 1, in other embodiments, the computing device 100 may include additional memory devices.

The chipset 110 is also communicatively coupled to a number of peripherals 112 via a number of signal paths 182. Again, similar to the signal paths 162, 166, 168, the signal paths 182 may be embodied as any type of signal paths capable of facilitating communication between the chipset 110 and the peripherals 112 such as, for example, any number of wires, printed circuit board traces, via, bus, point-to-point interconnects, intervening devices, and/or the like. The peripherals 112 may include any number of peripheral devices including data storage devices, interfaces, and output devices. For example, as illustrated in FIG. 1, the peripheral devices 112 may include a hard disk 184, an inband network interface card (NIC) 186, and an out-of-band network interface card 188. Additionally, in other embodiments, the computing device 100 may include additional or other peripheral devices depending upon, for example, the intended use of the computing device 100. Further, it should be appreciated that the computing device 100 may include other components, sub-components, and devices not illustrated in FIG. 1 for clarity of the description. For example, it should be appreciated that the memory controller hub 170 may include a video controller for controlling a video display or interface and that the input/output controller hub 172 may include an interrupt controller for generating interrupt events.

As illustrated in FIG. 1, at least two or more processor cores of the universe of available processor cores of the computing device (e.g., processor cores 120, 122, 124, 126, 130, 132, 134, 136, 140, 142, 144, 146, 150, 152, 154, 156 in the illustrative embodiment) are sequestered for handling management interrupts such as system management interrupts and/or platform management interrupts. For example, in the embodiment illustrated in FIG. 1, processor cores 122, 132, 140, and 152 have been sequestered to handle the management interrupts and are allocated to a management interrupt handling process group 190. The remaining non-sequestered processor cores 120, 124, 126, 130, 134, 136, 142, 144, 146, 150, 154, 156 are allocated to performing other functions such as executing an operating system and, in some embodiments, may be allocated to one or more main partitions. In some embodiments, the management interrupt handling process group 190 may be allocated to a platform resource layer (not shown). Regardless, the sequestered processor cores 122, 132, 140, 152 are "hidden" from any operating system being executed by the non-sequestered processor cores 120, 124, 126, 130, 134, 136, 142, 144, 146, 150, 154, 156.

In the illustrative embodiment, four processor cores 122, 132, 140, 152 have been sequestered by the interrupt handling process group 190 to handle management interrupts. However, in other embodiments, the interrupt handling process group 190 may sequester any number of processor cores greater than a single core. Because the management interrupt handling process group 190 includes more than a single processor core, an amount of redundancy and fault tolerance is achieved. That is, if one processor core of the management interrupt handling process group 190 fails or is otherwise unavailable, the process group 190 is still capable of handling any management interrupts using one or more of the remaining sequestered processor cores. In addition, in the case of a processor core failure, the management interrupt handling process group 190 may be updated with a new processor core and/or re-elected or populated with an entirely new group of processor cores.

The particular processor cores sequestered by the management interrupt handling process group 190 may be selected using any one of a number of different algorithms and/or methodologies. For example, in some embodiments, a virtual synchrony algorithm may be used to elect the processor cores to be sequestered and maintain or update such grouping over time (e.g., if one or more of the processor cores fail). In such embodiments, the management interrupt handling process group 190 forms a distributed state machine, which is updated as events, such as processor core failure, occur. If a processor core fails, such an event is reported to the other processor cores. Additionally, if a processor core is added to the group 190, a state transfer is used to initialize the newly sequestered processor core. Because each processor group has more than a single processor core assigned thereto, failure of one processor core of the group of processor cores does not create a failure for the processor group itself.

In other embodiments, a Paxos algorithm may be used to elect the processor core grouping. In such embodiments, the processor core groups are elected by solving consensus of each processor core within the total plurality of processor cores. Under the Paxos algorithm, "consensus" is defined as determining one result or decision among a group of participants (i.e., the processor cores). Additionally, in one particular embodiment, the sequestered processor cores are selected such that at least one processor core from each processor 102, 104, 106, 108 is included in the management interrupt handling process group 190. Further, in some embodiments, the sequestered processor cores are selected from a sub-group of processor cores that have been previously identified and/or allocated for "hot spares". That is, the sequestered processor cores may be selected from those processor cores that are allocated for as "back-up" processor cores should one of the main processor cores fail. Additionally or alternatively, the sequestered processor cores may be selected so as to ensure that not all of the sequestered processor cores are from a single processor. As such, if one of the processors 102, 104, 106, 108 and/or the respective hardware sockets should fail, the management interrupt process group 190 remains capable of handling any management interrupt using the sequestered processor cores from the remaining viable processors.

In use, when a management interrupt event, such as a system management interrupt and platform management interrupt, is generated by the chipset 110, the management interrupt is directed to the one or more of the sequestered processor cores 122, 132, 140, 152 of the management interrupt handling process group 190. That is, unlike a typical computing device wherein the management interrupt is broadcasted to each processor core of each processor, the management interrupt is directed only to one or more of the sequestered processor cores 122, 132, 140, 152. In this way, the non-sequestered processor cores 120, 124, 126, 130, 134, 136, 142, 144, 146, 150, 154, 156 may continue processing and performing other functions while the sequestered processor cores 122, 132, 140, 152 handle the generated management interrupt (e.g., the system management interrupt or the platform management interrupt). If the management interrupt requires the attention or processing of the remaining non-sequestered processor cores 120, 124, 126, 130, 134, 136, 142, 144, 146, 150, 154, 156, one or more of the sequestered processor cores 122, 132, 140, 152 may be configured to broadcast the management interrupt (or a new management interrupt in response to the original management interrupt event) to the non-sequestered processor cores 120, 124, 126, 130, 134, 136, 142, 144, 146, 150, 154, 156.

Figure 2:
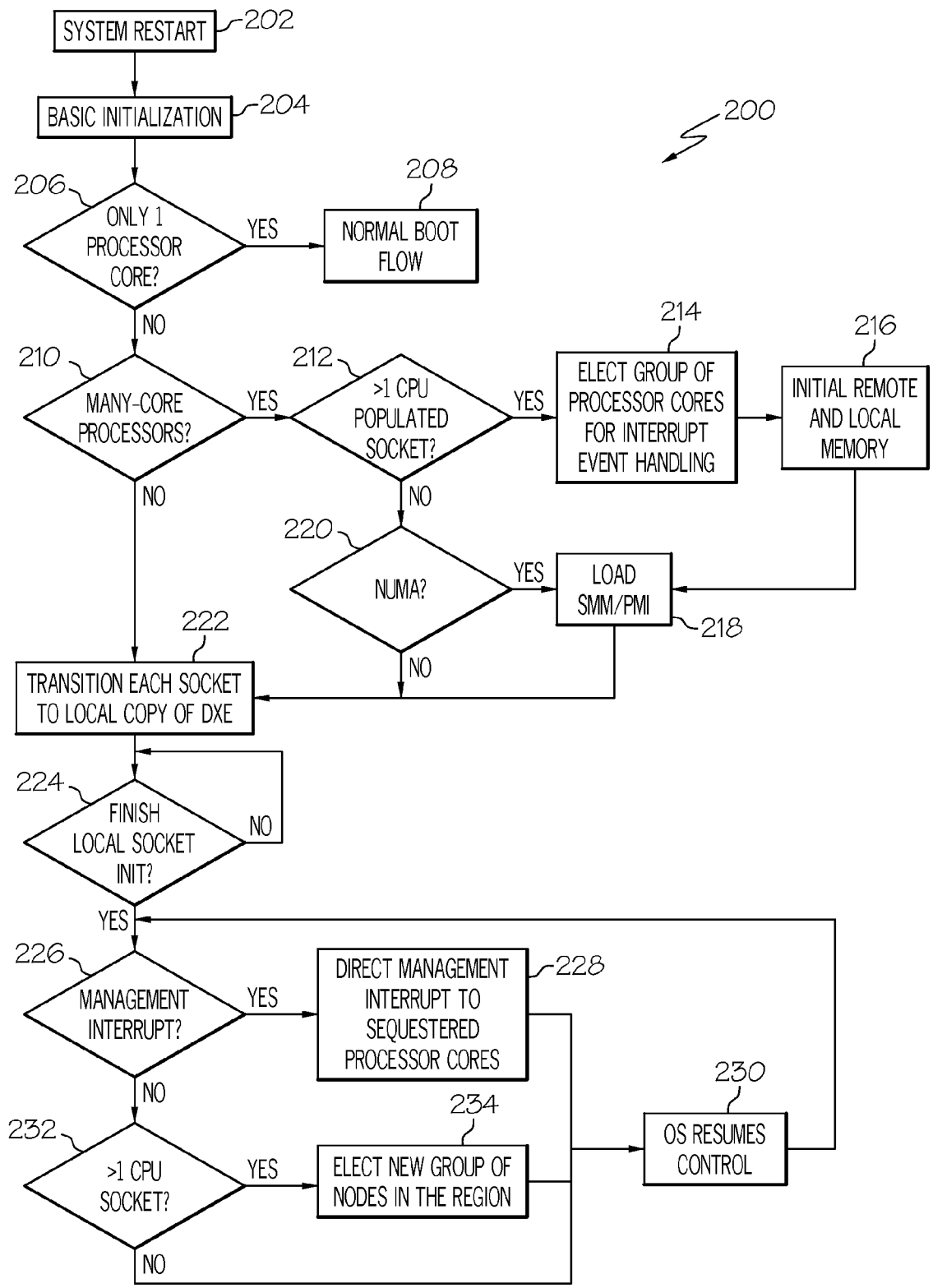
FIG. 2 is a simplified flowchart of an algorithm for electing a group of processor cores for handling management interrupts.

Referring now to FIG. 2, an algorithm 200 for handling management interrupts for use by the computing device 100 begins with block 202 in which the computing device 100 performs a system restart. In block 204, the computing device 100 performs some basic initialization including processor initialization procedures and memory cache initialization procedures. In block 206, the computing device 100 determines if there is only one processor core in the device 100. If the computing device 100 is a single processor core device, the algorithm 200 proceeds to a typical boot flow process in block 208.

However, if the computing device 100 includes more than a single processor core, the computing device 100 determines if the processors 102, 104, 106, 108 are many-core processors in block 210. The particular threshold at which a processor is considered to be a many-core processor may be selected or assigned based on the particular architecture, implementation, or intended use of the computing device 100. For example, in one embodiment, processors having more than eight processor cores may be considered many-core processors. However, in other embodiments, processors having more or fewer processor cores may be determined to be many-core processors.

If the computing device 100 determines that the processors 102, 104, 106, 108 are many-core processors in block 210, the computing device 100 determines whether there is greater than a single processor populated socket in block 212. That is, the computing device 100 determines whether the processor group includes a single processor coupled to a single socket or multiple processors, each coupled to a separate socket in block 212. If so, an initial management interrupt handling process group 190 is elected in block 214. That is, two or more processor cores are sequestered by the management interrupt handling process group 190 for handing management interrupts such as system management interrupts and/or platform management interrupts. As discussed above, the management interrupt handling process group 190 may include any number of processor cores. Additionally, one of a number of different algorithms may be used to elect and maintain the management interrupt handling process group 190 including, but not limited to, virtual synchrony, Paxos, and other algorithms. Again, in one particular embodiment, the sequestered processor cores are selected such that at least one processor core from each processor 102, 104, 106, 108 is included in the management interrupt handling process group 190. The remote and local memory devices 160, 164, 178, 180 are initialized in block 216 and the system management mode is loaded in block 218. For example, in regard to system management interrupts, drivers may be loaded into System Management Random Access Memory (SMRAM), which respond to System Management Interrupts (SMIs). Additionally or alternatively, drivers may be registered to respond to the Platform Management Interrupts (PMIs).

Referring back to block 212, if the computing device 100 determines that only a single processor socket is populated (i.e., the computing device 100 is a single-processor device), it is determined whether the computing device 100 uses a non-uniform memory architecture (NUMA) in block 220. If so, the system management mode is loaded in block 218 as discussed above. In block 222, each processor is transitioned to a local copy of the Driver Execution Environment (DXE) and the computing device 100 determines if the local socket initialization process is complete in block 224.

In block 226, the computing device 100 determines if a management interrupt, such as a system management interrupt or a platform management interrupt, has been generated. The management interrupt may be generated by, for example, the chipset 110. If so, the management interrupt is directed to the sequestered processor cores (e.g., processor cores 122, 132, 140, 152 as illustrated in FIG. 1) of the management interrupt handling processor group 190 in block 228. That is, for example, the chipset 110 may be configured to direct any management interrupt, such as a system management interrupt or a platform management interrupt, to the sequestered processor cores 122, 132, 140, 152 of the management interrupt process group 190, rather than broadcasting the management interrupt to all processor cores of the processors 102, 104, 106, 108. To do so, identifiers of the sequestered processor cores 122, 132, 140, 152 may be stored and used by the chipset 110 to direct the management interrupt to the appropriate processor core. For example, the identifiers may be stored in a register of the chipset 110, in a memory location of the memory devices 178, 180, or in another memory location from which the chipset 110 may retrieve the identifier. Such functionality may be embodied in the Unified Extensible Firmware Interface (UEFI) of the computing device 100.

In response to receiving the management interrupt, the sequestered processor cores 122, 132, 140, 152 are configured to enter system management mode to handle the management interrupt. For example, the processor core 122, 132, 140, 152 may migrate a portion of the memory, update a memory page, or perform another function in response to and depending on the type of management interrupt event. If management interrupt requires the attention of the non-sequestered processor cores 120, 124, 126, 130, 134, 136, 142, 144, 146, 150, 154, 156, one or more of the sequestered processor cores 122, 132, 140, 152 may broadcast the management interrupt (or a secondary management interrupt in response to the original management interrupt) to the non-sequestered processor cores 120, 124, 126, 130, 134, 136, 142, 144, 146, 150, 154, 156. The operating system resumes control in block 230.

Figure 3:
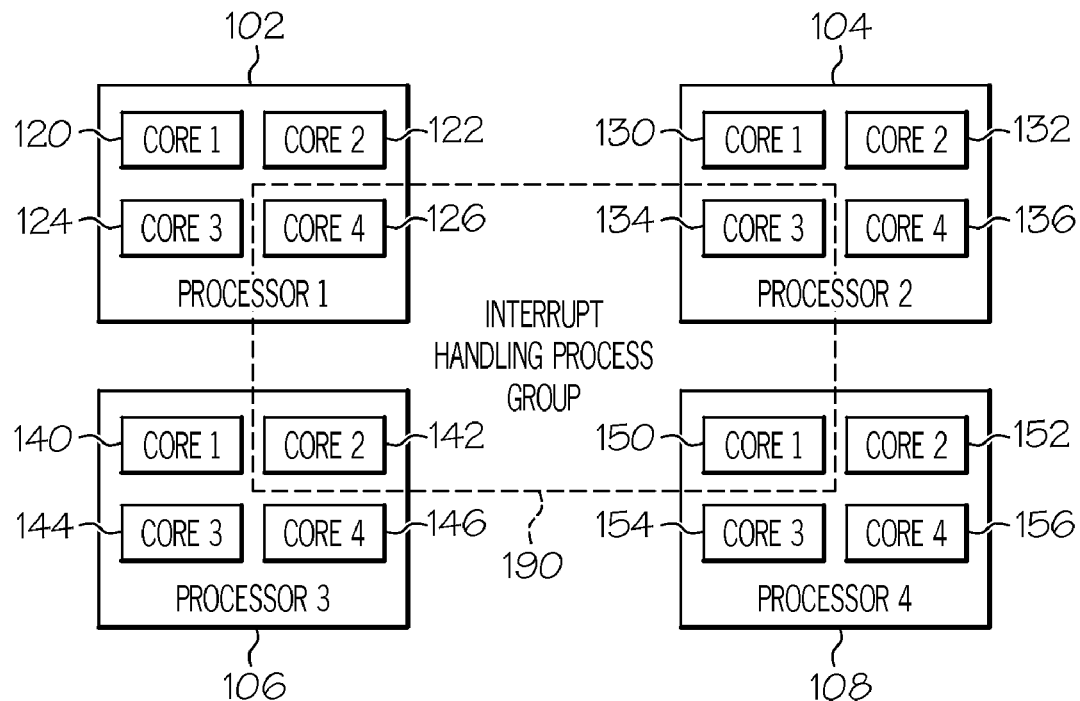
FIG. 3 is a diagram of one embodiment of a management interrupt handling process group including a number of processor cores.
Figure 4:
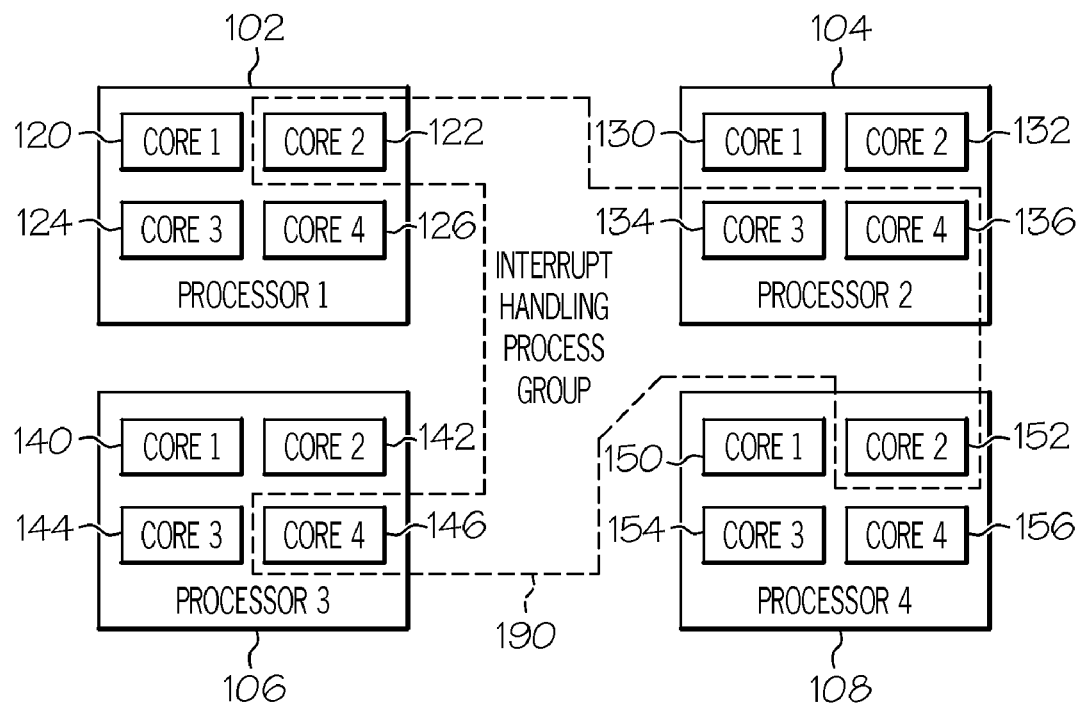
FIG. 4 is a diagram of another embodiment of an interrupt handling process group including a number of processor cores.

Referring back to block 226, if a management interrupt has not occurred, the computing device 100 again determines whether there is greater than a single processor populated socket in block 232. If so, a new management interrupt handling process group 190 is elected or otherwise selected in block 234. In this way, the management interrupt handling process group 190 is periodically updated. As such, if one or more of the sequestered processor cores fails, the non-viable processor core may be replaced in block 234. For example, as illustrated in FIG. 3, the management interrupt handling process group 190 may initially include processor cores 126, 134, 142, 150. The management interrupt handling process group 190 may be updated in block 234 as illustrated in FIG. 4 to include processor cores 122, 146, 134, 136, 152. Again, as discussed above, the sequestered processor cores may be selected using any suitable algorithm such as virtual synchrony, Paxos, or other algorithm. For example, as illustrated in FIGS. 3 and 4, the management interrupt handling process group 190 may be selected such that at least one processor core from each processor 102, 104, 106, 108 is sequestered.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
   sequestering two or more processor cores from a plurality of processor cores of a computing device to form a first group of sequestered processor cores and a second group of non-sequestered processor cores from the plurality of processor cores; and
   delivering a management interrupt, accessible only to the first group of sequestered processor cores, for handling.

2. The method of claim 1, wherein the management interrupt is selected from a group of management interrupts comprising a system management interrupt and a platform management interrupt.

3. The method of claim 1, wherein sequestering two or more processor cores comprises selecting the two or more processor cores from a plurality of processor cores of a plurality of processors of the computing device such that at least one processor core of each processor of the plurality of processors is sequestered.

4. The method of claim 1, wherein sequestering two or more processor cores comprises selecting the two or more processor cores of the first group of sequestered processor cores using a virtual synchrony algorithm.

5. The method of claim 1, wherein sequestering two or more processor cores comprises selecting the two or more processor cores of the first group of sequestered processor cores from a sub-set of processor cores of the plurality of processor cores that are designated as hot spare cores.

6. The method of claim 1, further comprising broadcasting the management interrupt from at least one of the processor cores of the first group of sequestered processor cores to one or more processor cores of the second group of non-sequestered processor cores.

7. The method of claim 1, further comprising handling the management interrupt with the one or more processor cores of the first group of sequestered processor cores without disrupting the operating of the processor cores of the second group of non-sequestered processor cores.

8. The method of claim 1, further comprising:
   un-sequestering the two or more processor cores forming the first group of sequestered processor cores; and
   sequestering two or more processor cores of the plurality of processor cores to form a second group of sequestered processor cores different from the first group of sequestered processor cores.

9. The method of claim 1, further comprising removing a first processor core from the first group of sequestered processing cores in response to the first processor core failing.

10. A non-transitory machine readable medium, comprising a plurality of instructions, that in response to being executed, result in a computing device
    sequestering at least one processor core from other processor cores of each processor of a multi-processor computing device such that no processor has every associated processor core sequestered; and
    configuring the computing device to deliver management interrupts accessible only to the sequestered at least one processor core.

11. The medium as recited in claim 10, wherein delivering management interrupts accessible only to the sequestered at least one processor core further comprises not delivering the management interrupts to the other processor cores of each processor of the computing device.

12. The medium of claim 10, wherein
    management interrupts are system management interrupts, and
    the plurality of instructions further result in the computing device, configuring the computing device to deliver system management interrupts to the at least one sequestered processor core of each processor and to not deliver the system management interrupts to the other processor cores of each processor of the computer device.

13. The medium of claim 10, wherein
    management interrupts are platform management interrupts, and
    the plurality of instructions further result in the computing device, configuring the computing device to deliver platform management interrupts to the at least one sequestered processor core of each processor and to not deliver the platform management interrupts to the other processor cores of each processor of the computer device.

14. The medium of claim 10, wherein the plurality of instructions further result in the computing device sequestering at least one processor core from other processor cores of each processor of the computing device by using a virtual synchrony algorithm.

15. The medium of claim 10, wherein the plurality of instructions further result in the computing device un-sequestering at least one of the sequestered processor cores.

16. The medium of claim 10, wherein the plurality of instructions further result in the computing device selecting the at least one processor core from other processor cores of each processor of the computing device from a sub-set of processor cores that are designated as hot spare cores.

17. A computing device comprising of:
   a plurality of processor cores; and
   a memory device coupled to the plurality of processor cores, the memory device having stored therein a plurality of instructions which when executed by at least one of the plurality of cores causes the at least one plurality of cores to:
      sequester at least two processor cores from the plurality of processor cores to form a first group of sequestered cores and a second group of non-sequestered processor cores from the plurality of processor cores; and
      deliver a management interrupt accessible only to the first group of sequestered processor cores for handling.

18. The computing device as recited in claim 17, wherein delivering management interrupts accessible only to the first group of sequestered cores further comprises not delivering the management interrupts to the second group of non-sequestered processor cores.

19. The computing device of claim 17, wherein the management interrupt is selected from a group of management interrupts comprising a system management interrupt and a platform management interrupt.

20. The computing device of claim 17, wherein to sequester at least two processor cores comprises to select the at least two processor cores from a plurality of processor cores of a plurality of processors of the computing device such that at least one processor core of each processor of the plurality of processors is sequestered.

21. The computing device of claim 17, wherein to sequester at least two processor cores comprises to select the two or more processor cores of the first group of sequestered processor cores using a virtual synchrony algorithm.

22. The computing device of claim 17, wherein the plurality of instructions further cause the at least one processor core to broadcast the management interrupt from at least one of the processor cores of the first group of sequestered processor cores to one or more processor cores of the second group of non-sequestered processor cores.

* * * * *